May 10, 1949.  H. B. BOYER  2,469,629
DEMOUNTABLE RIM FOR TIRES
Filed Oct. 29, 1946
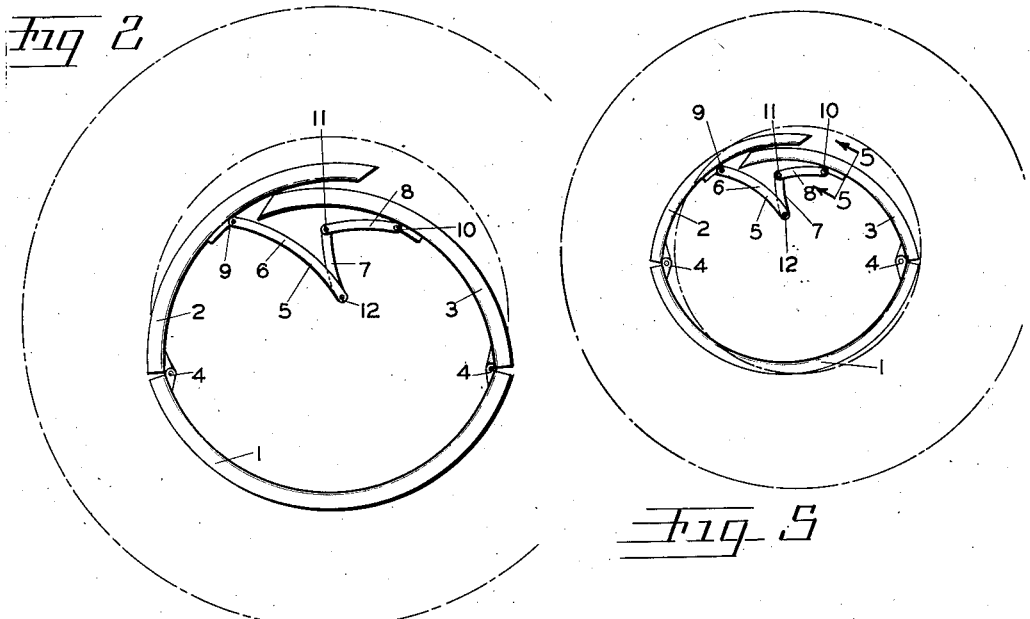
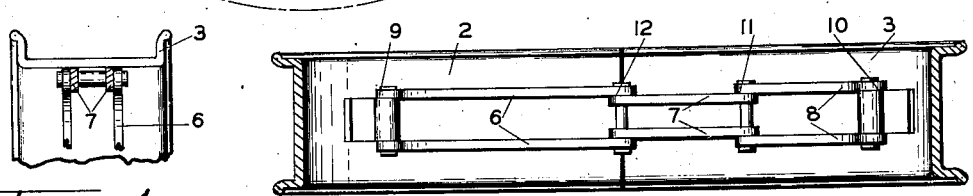
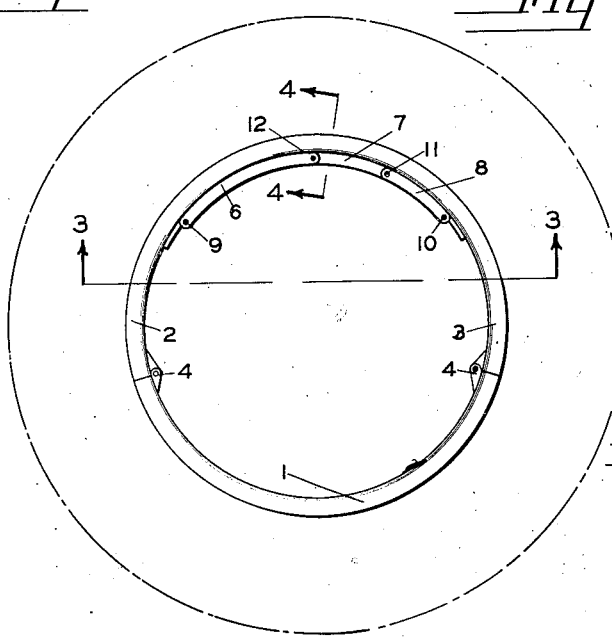
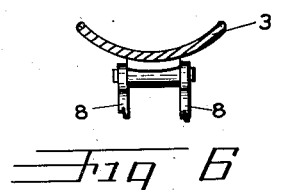
INVENTOR.
HOWARD B BOYER
BY
ATTORNEY Patented May 10, 1949

2,469,629

UNITED STATES PATENT OFFICE 2,469,629

DEMOUNTABLE RIM FOR TIRES

Howard B. Boyer, Eugene, Oreg., assignor of one-third to William R. Goss, Eugene, Oreg.

Application October 29, 1946, Serial No. 706,389

4 Claims. (Cl. 301—32)

This invention relates to demountable rims for tires and is particularly adapted for mounting tires to the wheels of vehicles or expanding vulcanizing tubes within tires while the tires are being vulcanized.

The primary object of the invention is to provide a lever mechanism for holding the rim in expanded position, and at the same time affording a quick method of collapsing the same while removing the rim from the tire.

A further object of the invention is to provide a mechanism for collapsing the rim in such a manner as to provide the necessary reduction in the diameter of the rim as to permit the same to be applied or removed from the tire with a minimum number of folding rim sections.

These and other incidental objects will be apparent in the drawings, specifications and claims.

Referring to the drawings:

Figure 1 illustrates my new and improved demountable rim in expanded position. The position of the tire indicated by broken lines, said rim being applied to tires mounted on wheels.

Figure 2 indicates the rim in collapsed position, the position of the tire being indicated by broken lines.

Figure 3 is a sectional view taken on line 3—3 of Figure 1, looking in the direction indicated.

Figure 4 is a sectional view taken on line 4—4 of Figure 1 looking in the direction indicated.

Figure 5 is the same as Figure 2 except that the rim is being applied within a tire which is about to be vulcanized, the tire being indicated by broken lines.

Figure 6 is a sectional view taken through the rim on line 6—6 of Figure 5 and indicates the shape of a rim that is used for vulcanizing purposes.

In the drawings:

My new and improved demountable rim consists of sections 1, 2 and 3. Sections 2 and 3 are hingedly mounted to the section 1 by hinges 4. In Figures 1, 2, 3 and 4 I have illustrated a conventional rim whose cross section is best illustrated in Figures 3 and 4, while in Figures 5 and 6 I have illustrated a rim whose cross section is best illustrated in Figure 6, this form of rim is commonly used for maintaining inflated vulcanizing expansion tubes within tires while the same are being vulcanized, but my new and improved system of expanding the rim is adaptable to either of the above applications.

A rim expanding and holding unit indicated in general by numeral 5 consists of links 6, 7 and 8 pivotally connected to the rim sections 2 and 3 at 9 and 10. This rim expanding unit is so designed as to expand the rim to the position shown in Figure 1, but at the same time collapsing the same to the position shown in Figures 2 and 5 sufficiently to remove the rim assembly from the tire. This is made possible due to the fact that the link 6 is twice as long as the links 7 and 8. By providing a double link arrangement to oppose the link 6, said double link being exactly the same length as the link 6, permits the expanding of the rim or collapsing the same with ease, and I wish to make claim to this form of assembly.

Referring to Figure 1 it will be noted that the pivot points 9 and 10 are located considerably lower than the point 12, which makes it necessary to provide two links 7 and 8 to permit the buckling of the assembly 5. This brings the pivot point 11 slightly below the pivot point 12 between the links 6 and 7. This permits the buckling of the holding assembly 5 to the position shown in Figures 2 and 5.

I will now describe the operation of my new and improved demountable rim. It will be noted that the hinge points 4 are slightly below center of the entire rim and that when the rim is collapsed it can be inserted within the tire because the overall dimension of the rim is smaller when collapsed than when the rim is expanded. and in case of Figure 5 by deflating the vulcanizing tube, not here shown, the rim can be shifted within the tire allowing for its insertion or removal.

When the rim is in place the expanding unit or assembly 5 is forced out towards the rim to the position shown in Figure 1. It will slightly expand the rim beyond its normal diameter while the pivot point 12 is passing a line between the pivot point 9 and the pivot point 11, after which the rim will contract to its normal diameter holding the linkage assembly adjacent the inner surface of the rim. When air pressure is applied to the tire it prevents expanding of the rim which prevents the buckling of the holding unit 5 due to the fact that the rim cannot expand for allowing the pivot point 12 to pass the line between point 9 and 11.

I do not wish to be limited to the exact mechanical structure illustrated, as other mechanical equivalents may be substituted still coming within the scope of my claims.

What I claim is:

1. A demountable tire rim comprised of three sections, the combined length of two sections being greater than the length of the other section, said two short sections being hingedly connected to the longer section on their one end, the opposite end of said sections adapted to register in line with each other, a collapsible expanding means for maintaining said sections in alignment, said expanding means comprised of three links, two of said links equalling the length of the third, the outer ends of said links being fixedly mounted at an equal distance from either side of the intersection of said short sections.

2. A demountable tire rim comprising a relatively long rim section, a pair of shorter rim sections, having their ends adjacent the long section hingedly connected to the respective ends of the long section and their adjacent ends provided for abutting engagement to align the short sections with the long section to form a circular rim when expanded and a linkage comprising a plurality of pivotally connected links joined to the respective short rim sections to form an arcuate locking assembly when the rim sections are in expanded circular arrangement and movable inwardly of the rim sections to provide for and permit collapse of the rim.

3. A demountable tire rim comprising a relatively long rim section, a pair of shorter rim sections, having their ends adjacent the long section hingedly connected to the respective ends of the long section and their adjacent ends provided for abutting engagement to align the short sections with the long section to form a circular rim when expanded, and a linkage comprising a relatively long link having one end pivotally connected to one short section of the rim intermediate its ends, a pair of relatively short links having adjacent ends pivotally connected, each of said short links having a length substantially one-half that of the long link, the outer end of one short link being pivoted to that short rim section other than the one to which the long link is connected, whereby said links are adapted to assume an arcuate arrangement for locking the rim sections when extended and are relatively breakable inwardly on their connections for providing for rim collapse.

4. A demountable tire rim comprising a relatively long rim section, a pair of shorter rim sections, having ends hingedly connected to the respective ends of the long section and their remaining ends provided for abutting engagement to align the short sections with the long section to form a circular rim when expanded, the total length of the short rim sections exceeding the length of the long rim section, a linkage connected with the short rim sections for releasably holding the rim sections in expanded relation, said linkage comprising three inwardly swinging links operative to releasably lock the sections in continuous circular arrangement.

HOWARD B. BOYER.

REFERENCES CITED

The following references are of record in the file of this patent:

UNITED STATES PATENTS

| Number | Name | Date |
|---|---|---|
| 1,461,503 | Stinson | July 10, 1923 |
| 1,597,377 | Hermanson | Aug. 24, 1926 |
| 1,611,046 | Klingaman | Dec. 14, 1926 |
| 1,931,229 | Koree | Oct. 17, 1933 |

FOREIGN PATENTS

| Number | Country | Date |
|---|---|---|
| 172,791 | Great Britain | Dec. 22, 1921 |

Certificate of Correction

May 10, 1949

Patent No. 2,469,629

HOWARD B. BOYER

It is hereby certified that the name of the assignee in the above numbered patent was erroneously written and printed as "William R. Goss" whereas said name should have been written and printed as *William G. Ross*; and that the said Letters Patent should be read as corrected above, so that the same may conform to the record of the case in the Patent Office.

Signed and sealed this 4th day of September, A. D. 1951.

[SEAL]

THOMAS F. MURPHY,
*Assistant Commissioner of Patents.*